United States Patent
Moon et al.

(10) Patent No.: US 7,871,838 B2
(45) Date of Patent: Jan. 18, 2011

(54) RUBBING SYSTEM FOR ALIGNMENT LAYER OF LCD AND METHOD THEREOF

(75) Inventors: Seung-Won Moon, Gyeonggi-Do (KR); Byoung-Chul Choi, Gyeonggi-Do (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 12/314,922

(22) Filed: Dec. 18, 2008

(65) Prior Publication Data
US 2009/0117677 A1    May 7, 2009

Related U.S. Application Data

(62) Division of application No. 11/478,381, filed on Jun. 30, 2006, now Pat. No. 7,482,188.

(30) Foreign Application Priority Data
Dec. 29, 2005   (KR) .............................. 2005-134589

(51) Int. Cl.
*H01L 21/00*   (2006.01)
(52) U.S. Cl. .............................. 438/30; 438/14; 438/29; 438/149; 257/E21.237; 257/E21.521; 257/E21.535
(58) Field of Classification Search ............ 257/E21.37, 257/E21.532
See application file for complete search history.

(56) References Cited

U.S. PATENT DOCUMENTS
2004/0080685 A1* 4/2004 Yamada et al. .............. 349/113
2006/0044503 A1    3/2006 Ham et al.

FOREIGN PATENT DOCUMENTS

| JP | 9-015603 | 1/1997 |
|---|---|---|
| JP | 2000-19520 | 1/2000 |
| JP | 2001-154198 | 6/2001 |
| JP | 2001-154199 | 6/2001 |
| JP | 2003-195251 | 7/2003 |
| JP | 2003-215594 | 7/2003 |

* cited by examiner

*Primary Examiner*—Walter L Lindsay, Jr.
*Assistant Examiner*—Cheung Lee
(74) *Attorney, Agent, or Firm*—McKenna Long & Aldridge LLP

(57) ABSTRACT

A rubbing system for an alignment layer of a liquid crystal display (LCD) device, comprises: a rubbing table on which a substrate having an alignment layer thereon is positioned; a rubbing roll on which a rubbing material is wound, substantially positioned on the rubbing table thus to substantially contact the alignment layer, for rubbing the alignment layer by rotation of the rubbing roll; and a controlling unit for controlling the alignment layer to be rubbed by substantially contacting the rubbing roll onto the alignment layer by simultaneously lifting and lowering a rubbing table and the rubbing roll according to an alignment controlling force to be applied to the alignment layer.

11 Claims, 4 Drawing Sheets

RUBBING SYSTEM FOR ALIGNMENT LAYER OF LCD AND METHOD THEREOF

This application is a divisional of U.S. application Ser. No. 11/478,381, filed Jun. 30, 2007, and claims benefit of Korean Patent Application No. 10-2005-0134589 filed on Dec. 29, 2005 now U.S. Pat. No. 7,482,188, which are hereby incorporated by reference for all purposes as if fully set forth herein. This application incorporates by reference U.S. Pat. No. 7,295,279 and U.S. Pat. No. 7,450,213 for all purposes as if fully set forth herein.

BACKGROUND OF THE INVENTION

1. Field of the Invention

The present invention relates to a rubbing system for an alignment layer of a liquid crystal display (LCD) device, and more particularly, to a rubbing system for an alignment layer of an LCD device capable of quickly and effectively controlling a gap between a rubbing roll and an alignment layer by moving the rubbing roll and a rubbing table, and capable of providing a uniform alignment controlling force to the alignment layer, and a method thereof.

2. Discussion of the Related Art

Recently, various portable electronic devices, such as mobile phones, personal digital assistants (PDAs), and note book computers have been developed, because of their light weight and compact sizes and power efficiency. Accordingly, flat panel display devices, such as liquid crystal displays (LCDs), plasma display panels (PDPs), field emission displays (FEDs), and vacuum fluorescent displays (VFDs), have been developed. Of these flat panel display devices, LCDs are currently mass produced because of their driving capabilities and superior image quality.

The LCD device may be classified as a transmissive type display device. LCDs display an image by controlling the amount of light that passes through a liquid crystal layer according to an initial alignment direction. Therefore, it is necessary to process an alignment layer of the LCD device so that liquid crystal molecules can initially have a uniform direction. Various methods for processing an alignment layer have been implemented. Among the various methods, the most frequently used method is a method for processing an alignment layer by rubbing. In the rubbing alignment processing method, an alignment layer is formed on a substrate and rubbing is performed by using an alignment material, thereby forming uniform microstructures on the alignment layer. As the alignment layer and liquid crystal molecules interact with each other by application of an alignment controlling force to the liquid crystal molecules, the liquid crystal molecules can be uniformly aligned on the entire surface of the alignment layer in a desired direction.

However, the method for processing an alignment layer by rubbing has the following problems. Rubbing is performed by contacting a rubbing roll, on which a rubbing material is wound, with the alignment layer that is formed on a substrate and then moving the rubbing roll in one direction. Because LCD devices are not only portable devices such as notebooks but can also include large electronic devices such as a television, etc., a size of the LCD device naturally increases (a mother substrate for fabricating a liquid crystal panel is larger in large devices). Therefore, width and weight of the rubbing roll are increased when an alignment layer of a large LCD device is processed by rubbing.

An alignment controlling force or a surface fixing force of the alignment layer rubbed by the rubbing roll are a function of microstructures formed on the alignment layer. Also, microstructure depth is varied according to pressure of the rubbing roll applied to the alignment layer. As width and weight of the rubbing roll are increased, uniformly maintaining a pressure applied to a mother substrate is difficult. Lack of uniform pressure applied to the mother substrate can result in defects on the alignment layer.

SUMMARY OF THE INVENTION

Accordingly, the present invention is directed to a rubbing system for alignment layer of LCD and method thereof, that substantially obviates one or more of the problems due to limitations and disadvantages of the related art.

An advantage of the present invention is to provide a rubbing system for an alignment layer of a liquid crystal display (LCD) device capable of applying a uniform alignment controlling force onto an alignment layer by uniformly maintaining a gap between the alignment layer and a rubbing roll by simultaneously lifting and lowering a rubbing table and the rubbing roll, and a method thereof.

Another advantage of the present invention is to provide a rubbing system for an alignment layer of a liquid crystal display (LCD) device capable of enhancing rubbing efficiency by selectively driving a rubbing table or a rubbing roll according to an alignment controlling force applied to an alignment layer, and a method thereof.

Yet another advantage of the present invention is to provide a method for fabricating a liquid crystal display (LCD) device using the rubbing system.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, there is provided a rubbing system for an alignment of a liquid crystal display device, comprising: a rubbing table on which a substrate having an alignment layer thereon is positioned; a rubbing roll on which a rubbing material is wound, positioned on the rubbing table thus to be substantially in contact with the alignment layer, for rubbing the alignment layer by rotation of the rubbing roll; and a controlling unit for controlling the alignment layer to be rubbed by contacting the rubbing roll onto the alignment layer by simultaneously lifting and lowering a rubbing table and the rubbing roll according to an alignment controlling force to be applied to the alignment layer.

Determining a rubbing intensity applied to the alignment layer on the basis of the information inputted by the input unit; and a rubbing table driving unit and a rubbing roll driving unit for respectively lifting and lowering the rubbing table and the rubbing roll according to a signal inputted from the driving controlling unit. The information may comprise LC panel area, alignment layer material, and a display mode.

The rubbing intensity may be determined according to an alignment controlling force to be applied to the alignment layer, and may correspond to a gap between the alignment layer and the rubbing roll.

In another aspect of the present invention, there is provided a rubbing system for an alignment of a liquid crystal display device, comprising: a rubbing table on which a substrate having an alignment layer thereon is positioned; and a rubbing roll positioned on the rubbing table thus to be in substantially contact with the alignment layer for rubbing the alignment layer by rotation of the rubbing roll, wherein the alignment and the rubbing roll substantially contact each other in accordance with that both the rubbing table and the rubbing roll are driven.

In another aspect of the present invention, there is provided a rubbing system for an alignment of a liquid crystal display device, comprising: a rubbing table on which a substrate having an alignment layer thereon is positioned; and a rubbing roll on which a rubbing material is wound, positioned on the rubbing table thus to be substantially in contact with the alignment layer, for rubbing the alignment layer by rotation of the rubbing roll, wherein the alignment and the rubbing roll substantially contact each other in accordance with that either the rubbing table or the rubbing roll is driven.

In another aspect of the present invention, there is provided a rubbing system for an alignment of a liquid crystal display device, comprising: a rubbing table on which a substrate having an alignment layer thereon is positioned; and a rubbing roll on which a rubbing material is wound, positioned on the rubbing table thus to be substantially in contact with the rotation of the rubbing roll.

In another aspect of the present invention, there is also provided a method for rubbing an alignment layer of a liquid crystal display device, comprising: transferring a substrate on which an alignment layer is formed onto a rubbing table; inputting information relevant to the alignment layer; calculating a rubbing intensity applied to the alignment layer according to the alignment layer information; driving the rubbing table and a rubbing roll according to the calculated rubbing intensity, and thus contacting the rubbing roll with the alignment layer; and rubbing the alignment layer by rotating the rubbing roll.

The step of contacting the rubbing roll onto the alignment layer may comprise driving the rubbing roll thereby approaching the rubbing table; and driving the rubbing table thereby contacting the rubbing roll with the alignment layer.

In another aspect of the present invention, there is provided, a method for fabricating a liquid crystal display device, comprising: providing a first substrate on which a driving device array is formed and a second substrate on which a color filter layer is formed; forming a first alignment layer and a second alignment layer on the first substrate and the second substrate, respectively; positioning the first substrate and the second substrate on a rubbing table; inputting information relevant to the first alignment layer or information relevant to the second alignment layer; calculating a rubbing intensity applied to the first alignment layer or the second alignment layer according to the inputted alignment layer information; lifting and lowering at least one of the rubbing table and a rubbing roll according to the calculated rubbing intensity thereby contacting the rubbing roll with the first alignment layer or the second alignment layer; rotating the rubbing roll thereby rubbing the first alignment layer or the second alignment layer; and attaching the first substrate and the second substrate to each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

A liquid crystal display (LCD) device displays images on a screen by using the refractive index anisotropy of liquid crystal. The LCD device displays an image by changing the alignment direction of liquid crystal molecules according to a voltage applied to a liquid crystal layer, and thus controls light transmittance that passes through the liquid crystal layer.

Figure 1:
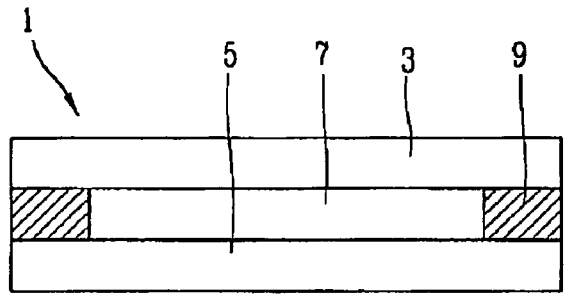
FIG. 1 is a schematic view showing a structure of a liquid crystal display (LCD) device according to the present invention.

FIG. 1 is a schematic view showing a structure of a liquid crystal display (LCD) device according to the present invention;

As shown in FIG. 1, the LCD device 1 comprises a lower substrate 5, an upper substrate 3, and a liquid crystal layer 7 formed therebetween. The lower substrate 5 may be a driving device array substrate, and may include a plurality of pixels (not shown) and a driving device, such as a thin film transistor (TFT) formed (not shown) near each pixel. The upper substrate 3 may be a color filter substrate, and may include a color filter layer for reproducing real color. In addition, a pixel electrode and a common electrode may be formed on the lower substrate 5 and the upper substrate 3, respectively. An alignment layer may be formed on both the lower and upper substrates 5 and 3 to align liquid crystal molecules of the liquid crystal layer 7.

The lower substrate 5 and the upper substrate 3 are attached along their perimeters by a sealing material 9, and the liquid crystal 7 is confined within the perimeter. In addition, the liquid crystal molecules of the liquid crystal layer 7 are reoriented by the driving device formed on the lower substrate 5 to control an amount of light transmitted through the liquid crystal layer 7, thereby displaying an image.

Figure 2:
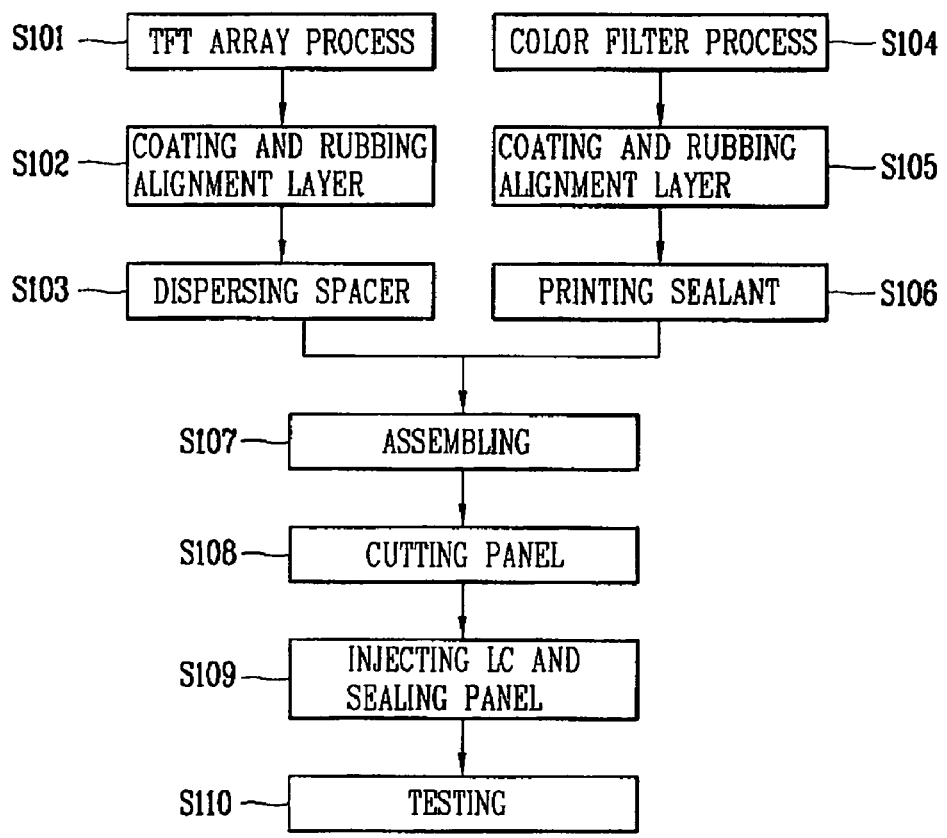
FIG. 2 is a flowchart showing a method for fabricating an LCD device according to the present invention.

FIG. 2 is a flowchart showing a method for fabricating an LCD device according to the present invention. Referring to FIG. 2, a fabrication method includes three sub-processes for manufacturing an LCD device: a driving device array substrate process S101 for forming the driving device on the lower substrate 5; a color filter substrate process S104 for forming the color filter on the upper substrate 3; and an overall cell process.

In Step S101, a plurality of gate lines and data lines are formed on the lower substrate 5 to define a pixel area by the driving device array process, and the thin film transistor connected to both the gate line and the data line is formed on each pixel area. In addition, a pixel electrode, which is connected to the thin film transistor to drive the liquid crystal layer according to a signal applied through the thin film transistor, is formed by the driving device array process.

In Step S104, R, G, and B color filter layers for reproducing color and a common electrode are formed on the upper substrate 3 by the color filter process.

In Step S102 and S105, alignment layers are formed on the lower substrate 5 and the upper substrate 3. Then, the alignment layers are individually rubbed to induce surface anchoring (i.e., a pretilt angle and alignment direction) for the liquid crystal molecules of the liquid crystal layer 7. In Step S103, at least a spacer is dispersed onto the lower substrate 5 for maintaining a uniform cell gap between the lower and upper substrates 5 and 3. In Step S106, a sealing material is printed along outer portions of the upper substrate 3. In Step S107, the lower and upper substrates 5 and 3 are assembled with each other.

The lower substrate 5 and the upper substrate 3 may both be made from a glass substrate, and include a plurality of unit panel areas on which the driving device and the color filter layer are formed. In Step S108, the bonded upper and lower substrates 5 and 3 are cut into unit panels. In Step S109, liquid crystal material is injected into a gap formed between the upper and lower substrates 5 and 3 of the unit panels through a liquid crystal injection port. In Step S109, the filled unit panel is completed by sealing the liquid crystal injection port. In Step S110, the filled and sealed unit panel is tested.

An alignment layer of the liquid crystal panel may be formed of polyimide or polyamide, or other suitable material and may be deposited by a spin coating method or a screen printing method. An alignment direction of the alignment layer is determined by a rubbing process after the alignment layer is dried for a certain time.

The rubbing process is performed by a rubbing roll on which a rubbing material is wound, and a rubbing system for an alignment of an LCD device will be explained with reference to FIGS. 3A and 3B.

Figure 3A:
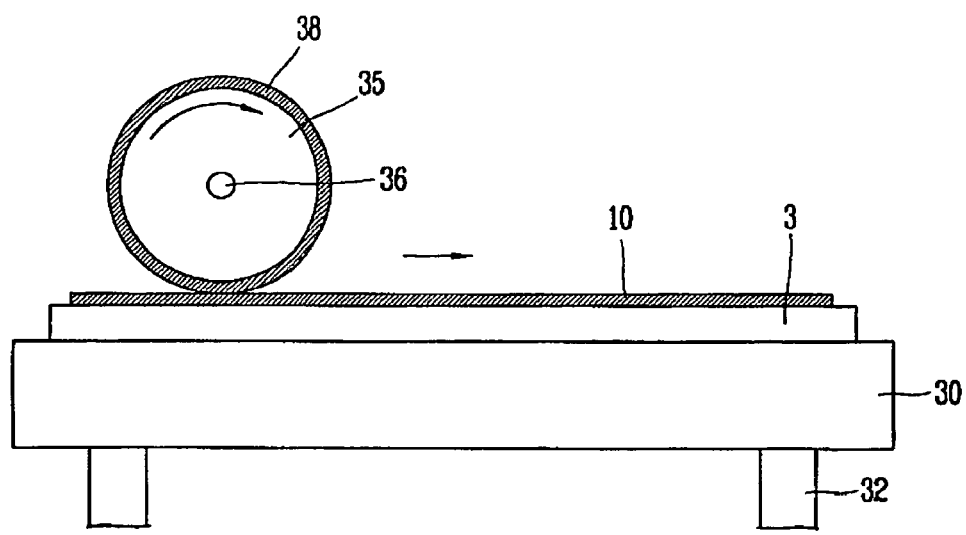
FIGS. 3A and 3B are views respectively showing a structure of a rubbing system for an alignment layer of an LCD device according to the present invention.
Figure 3B:
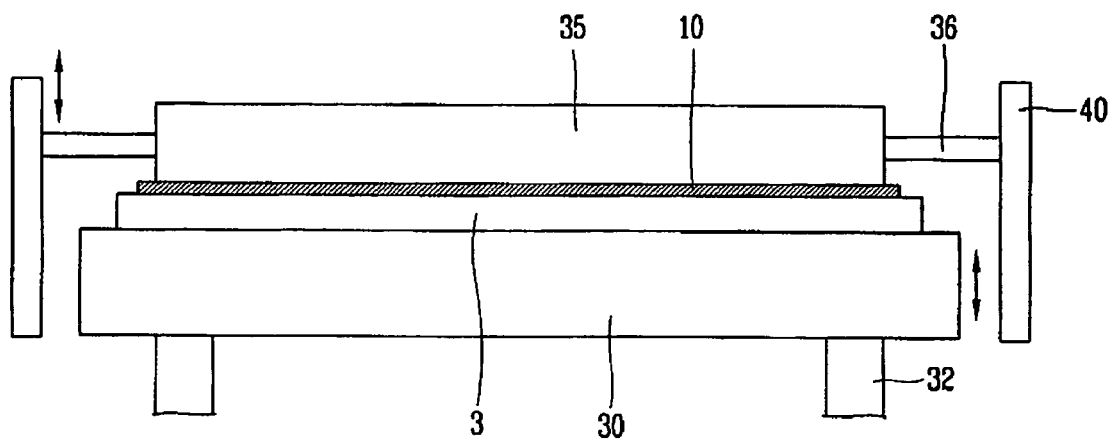

As shown in FIGS. 3A and 3B, the rubbing system for an alignment layer of an LCD device comprises a rubbing table 30 on which a substrate 3 having an alignment layer 10 thereon is positioned and supported by a plurality of legs 32; and a rubbing roll 35 positioned on the rubbing table 30, substantially contacting the alignment layer 10 on the substrate 3 by being lowered, and forming microstructures on the alignment layer 10 by rotation of the rubbing roll, for providing an alignment controlling force or a surface fixing force to the alignment layer 10.

A rubbing material 38 contacting the alignment layer 10 and forming microstructures on the alignment layer 10 may be wound on the rubbing roll 35. The rubbing roll 35 may be rotated centering around a rotation shaft 36, and is moved on the alignment layer 10 in an appropriate direction.

Figure 4:
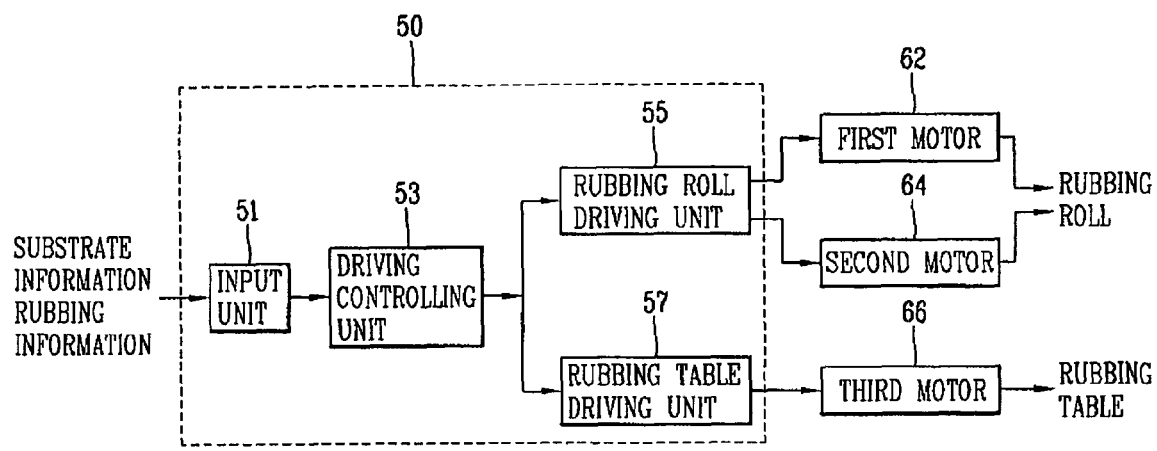
FIG. 4 is a block diagram showing a structure of a controlling unit of the rubbing system for an alignment layer of an LCD device according to the present invention.

Although not shown in FIG. 3A but shown in FIG. 4, the rubbing table 30 is provided with a motor for contacting the alignment layer 10 formed on the substrate 3 to the rubbing roll 35 by lifting or lowering the rubbing table 30. The motor is installed substantially at the leg 32 of the rubbing table 30, so that the rubbing table 30 is lifted and lowered by lifting and lowering the leg 32. However, the motor can be installed at another position. The rotation shaft 36 of the rubbing roll 35 is connected to a motor (not shown). As the motor is rotated, the rubbing roll 35 is rotated. As shown in FIG. 3B, a guide bar 40 is substantially at both side surfaces of rotation shafts 36. As the rotation shaft 36 moves along the guide bar 40 thus to lower the rubbing roll 35, the alignment layer 10 formed on the substrate 3 substantially contacts the rubbing roll 35.

As aforementioned, the alignment layer 10 on the substrate 3 positioned on the rubbing table 30 substantially contacts the rubbing material 38 of the rubbing roll 35 by lifting and lowering the rubbing table 30 and the rubbing roll 35. A gap between the alignment layer 10 and the rubbing roll 35 may be controlled by lifting and lowering both the rubbing table 30 and the rubbing roll 35, thereby performing a substantially uniform and evenly distributed rubbing for the alignment layer 10. The rubbing method has the following advantages.

First, the weight of the rubbing system is decreased. In the past, to move only the rubbing table required a bulky and heavy driving device. Accordingly, in the past, the entire size and weight of the rubbing table were increased. On the contrary, in the present invention, both the rubbing table 30 and the rubbing roll 35 are moved, a driving device installed at the rubbing table 30 has a relatively small size (herein, a driving device installed at the rubbing roll 35 is much smaller than the driving device of the rubbing table 30) and thus the entire size and weight of the rubbing system are decreased.

Second, a gap between the alignment layer 10 and the rubbing roll 35 can be controlled to be substantially uniform. Since the gap between the alignment layer 10 and the rubbing roll 35 determines a pressure of the rubbing roll 35 applied to the alignment layer 10, the gap is a factor for determining a size of each microstructure formed on the alignment layer 10. However, if the substrate 3 becomes large, a width of the rubbing roll 35 is increased and thus the heavy rubbing roll 35 may be minutely bent by the force of gravity. Because of this, if the rubbing roll 35 is in contact with the alignment layer 10 by being moved up and down, the gap between the alignment layer 10 and the rubbing roll 35 may not be uniform. On the contrary, if both the rubbing table 30 and the rubbing roll 35 are moved, as in the present invention, the motion of the rubbing roll 35 becomes relatively small. Accordingly, the gap between the alignment layer 10 and the rubbing roll 35 becomes substantially uniform at the time of rubbing thereby forming microstructures having a uniform size on the alignment layer 10.

The rubbing table 30 and the rubbing roll 35 of the rubbing system are driven by a controlling unit. A structure of the controlling unit will be explained with reference to FIG. 4.

As shown in FIG. 4, the controlling unit 50 may comprise an input unit 51 for inputting information such as liquid crystal panel size, alignment layer type, a display mode of a liquid crystal panel, and other relevant data from outside (for example, a driving device array processing line or a color filter processing line); a driving controlling unit 53 for outputting a signal for driving the rubbing table 30 or the rubbing roll 35 based on each information inputted by the input unit 51; a rubbing roll driving unit 55 for driving a first motor 62 and a second motor 64 according to a signal outputted from the driving controlling unit 53; and a rubbing table driving unit 57 for driving a third motor 66 according to a signal outputted from the driving controlling unit 53.

The driving controlling unit 53 determines an alignment controlling force or a surface fixing force to be applied to the alignment layer 10 on the basis of inputted information. The alignment controlling force varies according to the gap between the rubbing roll 35 and the alignment layer 10, that is, a rubbing intensity of the rubbing roll 35. Therefore, the driving controlling unit 53 calculates the gap between the rubbing roll 35 and the alignment layer 10, that is, the rubbing intensity according to the alignment controlling force. The alignment controlling force (or the rubbing intensity calculated based on the alignment controlling force) can be determined by the driving controlling unit 53, or can be determined by an external unit and then inputted to the controlling unit 50 by the input unit 51.

The controlling unit 50 judges a condition for moving the rubbing table 30 and the rubbing roll 35 up and down on the basis of inputted information, thereby moving the rubbing table 30 and the rubbing roll 35 up and down. The first motor 62 driven by the rubbing roll driving unit 55 rotates the rubbing roll 35, and the second motor 64 lifts and lowers the rubbing roll 35 along the guide bar 40.

The rubbing method for an alignment layer using the rubbing system will be explained in more detail.

Figure 5:
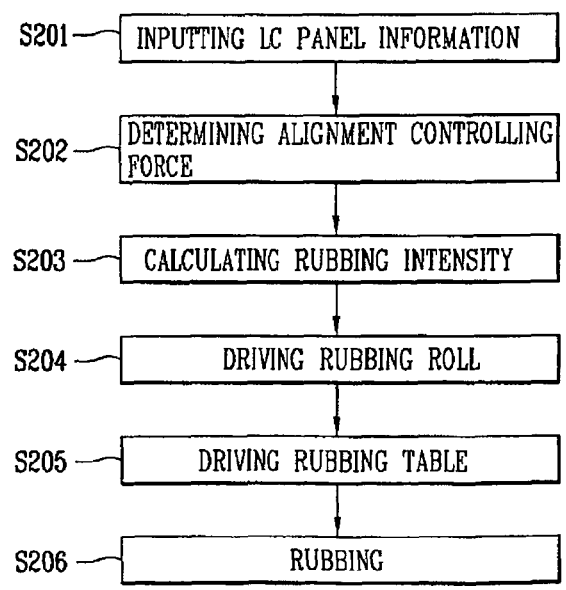
FIG. 5 is a flowchart showing a method for rubbing an alignment layer of an LCD device according to the present invention.

FIG. 5 is a flowchart showing a method for rubbing an alignment layer of an LCD device according to the present invention. As shown, a first substrate on which a thin film transistor and a pixel is formed by a driving device array process and a second substrate on which a color filter is formed by a color filter process are transferred to the rubbing system, and each kind of information relevant to the substrates is inputted (S201). Herein, the substrate information may comprise liquid crystal panel area to be fabricated, a display mode, alignment layer material, and other parameters. The substrate information determines an alignment controlling force applied to the alignment layer, that is, a size of a microstructure. The driving controlling unit 53 determines the alignment controlling force of the alignment layer on the basis of the substrate information, thereby calculating the gap between the alignment layer 10 and the rubbing roll 35, that is, the rubbing intensity of the rubbing roll 35 applied to the alignment layer 10 (S202, S203).

Then, the driving controlling unit 53 drives the rubbing roll 35 and the rubbing table 30 according to the rubbing intensity (S204, S205). Herein, the rubbing roll 35 and the rubbing table 30 can be simultaneously driven, or the rubbing table 30 can be driven after the rubbing roll 35 is driven first.

The rubbing roll 35 weighs less than the rubbing table 30. Driving the rubbing roll 35 rather than driving the rubbing table 30 contributes to a fast driving speed and a small load applied to a driving motor, thereby reducing power consumption and noise. Since both side surfaces of the rubbing roll 35 may be bent by gravity, it may not be easy to uniformly control the gap between the rubbing table 30 and the rubbing roll 35 by moving the rubbing roll 35. Therefore, it may be desirable to move the rubbing table 30 in order to control the gap between the rubbing table 30 and the rubbing roll 35. Thus, driving and moving are functions of convenience and practicality.

When the rubbing roll 35 substantially contacts the alignment layer 10 in consideration of each aforenoted advantage of the rubbing table 30 and the rubbing roll 35, the rubbing roll 35 may be moved near the rubbing table 30 by a certain distance thereby narrowing the gap therebetween. Then, the gap between the rubbing table 30 and the rubbing roll 35 may be controlled by driving the rubbing table 30.

As the rubbing table 30 and the rubbing roll 35 are sequentially driven, the alignment layer 10 and the rubbing roll 35 quickly contact each other and the gap therebetween is uniformly controlled. When the alignment layer 10 and the rubbing roll 35 come in contact with each other, the alignment layer 10 is rubbed by driving the rubbing roll 35 (S206). Although not shown, a substrate having undergone a rubbing treatment may be transferred to another processing line thus to be attached to another substrate. A liquid crystal layer is formed between the two substrates, thereby completing an LCD device.

As aforementioned, in the present invention, the gap between the alignment layer 10 and the rubbing roll 35 (that is, a function of the rubbing intensity) may be set according to predetermined information of a liquid crystal panel. Then, the rubbing roll 35 may be moved to have a preset gap from the alignment layer 10 by sequentially moving the rubbing roll 35 and the rubbing table 30. Then, the alignment layer 10 is rubbed by rotating the rubbing roll 35. When the substrate is positioned on the rubbing table 30, both the rubbing table 30 and the rubbing roll 35 are driven thereby to control the gap between the alignment layer 10 and the rubbing roll 35. Accordingly, the gap between the alignment layer 10 and the rubbing roll 35 can be quickly and efficiently controlled, and a uniform gap therebetween can be maintained.

The rubbing table 30 and the rubbing roll 35 may be separately driven as opposed to simultaneously driven. If only the rubbing table 30 is driven, the gap between the alignment layer 10 and the rubbing table 30 can be uniformly controlled, and thus microstructures having a uniform size can be formed on the entire alignment layer 10. It may be desirable to drive only the rubbing table 30 when a large pressure between the rubbing roll 30 and the alignment layer 10 is needed, that is, when a microstructure of a large size is to be formed.

When the rubbing roll 35 is driven, the gap between the rubbing roll 35 and the alignment layer 10 can be quickly controlled and a size of a driving motor can be decreased since the rubbing roll 35 is relatively lighter in weight and is more easily driven than the rubbing table 30. Therefore, fabrication cost is reduced and noise is not generated.

The rubbing system according to the present invention can perform rubbing for the alignment layer 10 by selectively driving the rubbing table 30 or the rubbing roll 35.

Figure 6:
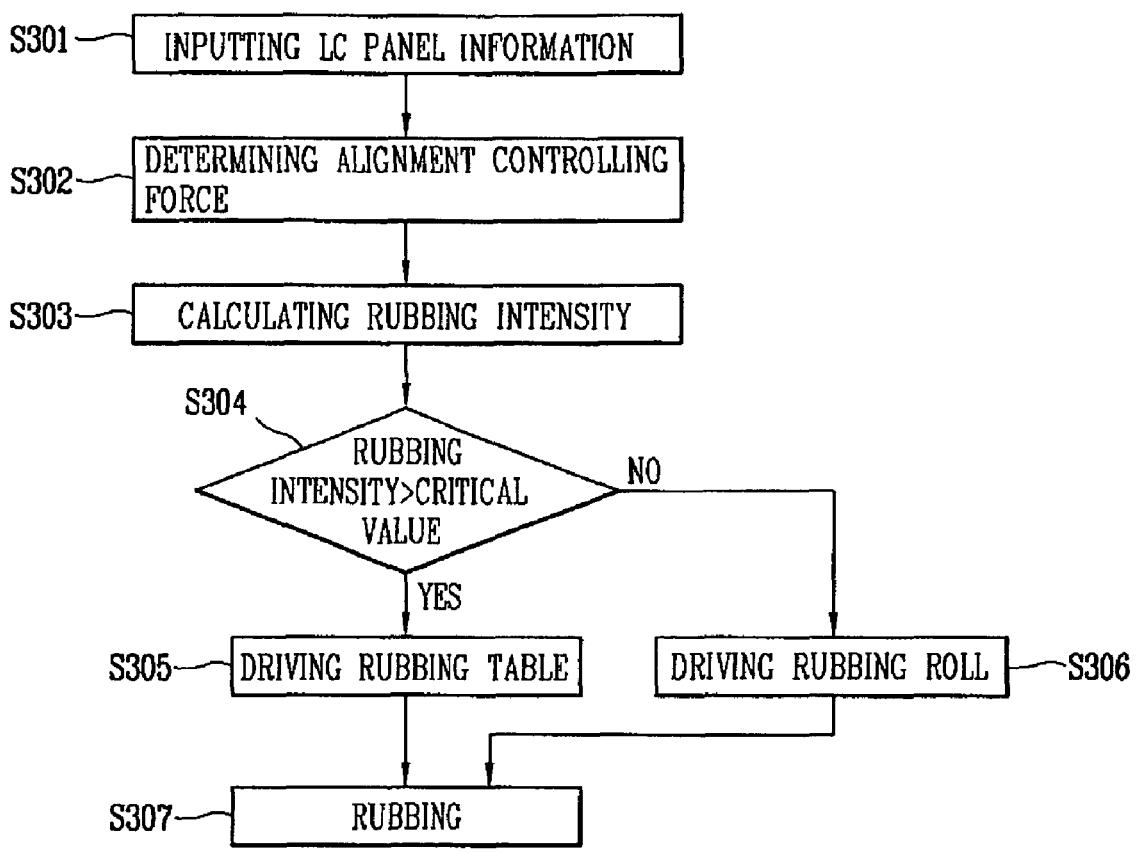
FIG. 6 is a flowchart showing a method for rubbing an alignment layer of an LCD device by selectively driving a rubbing table or a rubbing roll according to the present invention.

As shown in FIG. 6, a first substrate on which a thin film transistor and a pixel is formed by a driving device array process and a second substrate on which a color filter is formed by a color filter process are transferred onto the rubbing table 30 of the rubbing system, and each kind of information relevant to the corresponding substrate is inputted (S301). Herein, the substrate information may comprise liquid crystal panel area to be fabricated, a display mode, an alignment layer material, and other relevant parameters. The substrate information determines an alignment controlling force applied to the alignment layer, that is, a size of a microstructure.

The driving controlling unit 53 determines the alignment controlling force of the alignment layer on the basis of the substrate information, thereby calculating the gap between the alignment layer 10 and the rubbing roll 35, that is, the rubbing intensity of the rubbing roll 35 applied to the alignment layer 10 (S302, S303).

A rubbing intensity critical value may be stored in the driving controlling unit 53. Such value is a critical value of the rubbing roll 35 to be applied to the alignment layer 10, by which the rubbing table 30 or the rubbing roll 35 is selected for driving. That is, the rubbing table 30 is driven or the rubbing roll 35 is driven according to whether the calculated rubbing intensity is larger than a critical value, thereby substantially contacting the rubbing roll 35 with the alignment layer 10.

As shown in FIG. 6, if the calculated rubbing intensity is smaller than the critical value, the driving controlling unit 53 applies a signal to the rubbing roll driving unit 55 thus to drive the second motor 64. As a result, the rubbing roll 35 is lowered to substantially contact the rubbing roll 35 onto the alignment layer 10 (S304,S306). On the contrary, if the calculated rubbing intensity is larger than the critical value, the driving controlling unit 53 applies a signal to the rubbing table driving unit 57 thus to drive the third motor 66. As a result, the rubbing table 30 is lifted to substantially contact the rubbing roll 35 onto the alignment layer 10 (S304,S305). When the rubbing roll 35 and the alignment layer 10 substantially contact each other, the first motor 62 is driven to rotate the rubbing roll 35 thereby to provide an alignment controlling force to the alignment layer 10 (S307).

The rubbing intensity is a function of several conditions and varies accordingly, especially, according to a display mode of the LCD device. For instance, regarding a twisted nematic (TN) mode, liquid crystal molecules arranged with a certain angle from a substrate are aligned in a substantially perpendicular direction to the substrate by an electric field applied to a liquid crystal layer. Therefore, a relatively small alignment controlling force may be effective. Accordingly, a small rubbing intensity may be preferred by increasing the gap between the alignment layer 10 and the rubbing roll 35.

In an In Plane Switching (IPS) mode device, liquid crystal molecules are rotated in a substantially horizontal direction to the surface of the substrate by an electric field applied to a liquid crystal layer. Therefore, a relatively large alignment controlling force may be effective. Accordingly, a large rubbing intensity may be preferred by decreasing the gap between the alignment layer 10 and the rubbing roll 35.

In a TN mode, a preset alignment controlling force, that is, a rubbing intensity may be smaller than a critical value. Therefore, the rubbing roll 35 is lowered to substantially contact the alignment layer 10 and then the rubbing roll 35 is driven. In an IPS mode, the preset alignment controlling force, that is, the rubbing intensity may be larger than the critical value. Therefore, the rubbing table 30 may be lifted thereby to substantially contact the alignment layer 10 with the rubbing roll 35, and then the rubbing roll 35 is driven. Then, a substrate having undergone a rubbing treatment may be transferred to another processing line thus to be attached to another substrate. A liquid crystal layer is formed between the two substrates, thereby completing an LCD device.

In the present invention, since the gap between the alignment layer 10 and the rubbing roll 35 may be controlled by simultaneously moving both the rubbing table 30 and the rubbing roll 35, a rubbing process having a uniform alignment controlling force can be performed. It is also possible to control the gap between the alignment layer 10 and the rubbing roll 35 by selectively driving the rubbing table 30 or the rubbing roll 35 and thus to provide a uniform alignment controlling force. The conditions for moving the rubbing table 30 and the rubbing roll 35 shown in the present invention are mere examples. That is, moving the rubbing table 30 and the rubbing roll 35 can be performed by and under various conditions. Also, the rubbing table 30 and the rubbing roll 35 can be selectively driven according to various conditions in addition to the TN mode or the IPS mode.

As aforementioned, in the present invention, the alignment layer and the rubbing roll substantially contact each other by moving both the rubbing table and the rubbing roll or by selectively moving the rubbing table or the rubbing roll according to rubbing conditions. Therefore, the gap between the alignment layer and the rubbing roll can be quickly and efficiently controlled, and a uniform alignment controlling force can be provided to the entire alignment layer.

While the present invention has discussed the imprinting of microstructures onto an alignment layer, it is to be understood that the invention encompasses other than alignment layers. Thus, the present invention may include any material upon which microstructures, and any other structures or apertures, are suitably imprinted. The invention also further encompasses the imprinting of color filters and size and shape of sub-color filters to be imprinted upon.

It will be apparent to those skilled in the art that various modifications and variations can be made in the present invention without departing from the spirit or scope of the invention. Thus, it is intended that the present invention cover the modifications and variations of the invention provided they come within the scope of the appended claims and their equivalents.

What is claimed is:

1. A method for rubbing an alignment layer of a liquid crystal display device, comprising:
    transferring a substrate on which an alignment layer is formed onto a rubbing table;
    inputting information relevant to said alignment layer;
    calculating a rubbing intensity applied to said alignment layer according to the alignment layer information;
    driving a rubbing table and rubbing roll according to the calculated rubbing intensity, and thus substantially contacting said rubbing roll with said alignment layer; and
    rubbing said alignment layer by rotating said rubbing roll, wherein the alignment layer information comprises alignment layer area formed on a liquid crystal panel, alignment layer material, and a display mode of a liquid crystal panel.

2. The method of claim 1, wherein the rubbing intensity is varied according to an alignment controlling force to be applied to the alignment layer.

3. The method of claim 1, wherein the rubbing intensity is varied according to a gap between the alignment layer and the rubbing roll.

4. The method of claim 1, wherein in the step of substantially contacting the rubbing roll with the alignment layer, the rubbing roll and the rubbing table are simultaneously driven.

5. The method of claim 1, further comprising:
    substantially contacting the rubbing roll with the alignment layer;
    driving the rubbing roll to approach the rubbing table; and
    driving the rubbing table thereby substantially contacting the rubbing roll with the alignment layer.

6. A method for rubbing an alignment layer of a liquid crystal display device, comprising:
    transferring a substrate on which an alignment layer is formed onto a rubbing table;
    inputting information relevant to said alignment layer;
    calculating a rubbing intensity applied to said alignment layer according to the alignment layer information;
    driving at least one of said rubbing table and a rubbing roll according to the calculated rubbing intensity, and thus substantially contacting said rubbing roll with said alignment layer; and
    rubbing said alignment layer by rotating said rubbing roll wherein the alignment layer information comprises alignment layer area formed on a liquid crystal panel, alignment layer material, and a display mode of a liquid crystal panel.

7. The method of claim 6, wherein the rubbing intensity is varied according to an alignment controlling force to be applied to the alignment layer.

8. The method of claim 6, wherein the rubbing intensity is varied according to a gap between the alignment layer and the rubbing roll.

9. The method of claim 6, wherein the step of substantially contacting the rubbing roll with the alignment layer comprises:
    comparing the rubbing intensity of the alignment layer with a critical value;
    lifting the rubbing table when the rubbing intensity is larger than the critical value; and lowering the rubbing roll when the rubbing intensity is smaller than the critical value.

10. The method of claim 9, wherein the alignment layer having the rubbing intensity larger than the critical value is applied to a liquid crystal panel of an in-plane switching (IPS) mode.

11. The method of claim 9, wherein the alignment layer having the rubbing intensity smaller than the critical value is applied to a liquid crystal panel of a twisted nematic (TN) mode.

* * * * *